(12) United States Patent
Furuyama

(10) Patent No.: US 10,496,021 B1
(45) Date of Patent: Dec. 3, 2019

(54) FIXING DEVICE AND IMAGE FORMING APPARATUS

(71) Applicant: TOSHIBA TEC KABUSHIKI KAISHA, Shinagawa-ku, Tokyo (JP)

(72) Inventor: Noboru Furuyama, Odawara Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/043,437

(22) Filed: Jul. 24, 2018

(51) Int. Cl.
*G03G 15/20* (2006.01)
*G03G 15/08* (2006.01)
*H04N 1/193* (2006.01)
*G03G 15/04* (2006.01)

(52) U.S. Cl.
CPC ... *G03G 15/2064* (2013.01); *G03G 15/04036* (2013.01); *G03G 15/0806* (2013.01); *G03G 15/0865* (2013.01); *G03G 15/2028* (2013.01); *G03G 15/2039* (2013.01); *H04N 1/1937* (2013.01)

(58) Field of Classification Search
CPC ......... G03G 15/04036; G03G 15/0806; G03G 15/0865; G03G 15/2028; G03G 15/2039; G03G 15/2053; G03G 15/2064; H04N 1/1937
See application file for complete search history.

(56) References Cited

U.S. PATENT DOCUMENTS 9,274,465 B2     3/2016   Samei et al.
2016/0223961 A1* 8/2016   Takagi ............... G03G 15/2053

* cited by examiner

*Primary Examiner* — Hoang X Ngo
(74) *Attorney, Agent, or Firm* — Foley & Lardner LLP

(57) ABSTRACT

A fixing device includes a circulating member, a pressure member, a pad material, a heater, a reflector, and a heat conductor. The circulating member includes an annular peripheral wall that is circularly movable. The pressure member is arranged to face an outer peripheral surface of the circulating member and forms a nip with the circulating member. The pad material abuts on an inner peripheral surface of the circulating member at a nip portion of the circulating member. The heater is arranged inside the circulating member and heats the circulating member. The reflector is inside the circulating member and reflects radiant heat of the heater to the circulating member. The heat conductor connects an area covering a pressed portion of the pad material against the circulating member. The reflector is formed of a material having higher thermal conductivity than the pad material.

17 Claims, 4 Drawing Sheets

FIXING DEVICE AND IMAGE FORMING APPARATUS

FIELD

Embodiments described herein relate generally to a fixing device and an image forming apparatus.

BACKGROUND

An image forming apparatus such as a multi function peripheral (MFP), a copy machine, and a printer includes a fixing device for fixing a toner image transferred to a recording medium such as a recording sheet.

A fixing device often includes a fixing belt (circulating member for fixing) of which an annular peripheral wall circularly moves and a pressure roller (pressure member) that is pressed against the outer surface of the fixing belt. The pressure roller is driven to rotate by a driving device such as a motor. A nip for fixing is formed between the pressure roller and the fixing belt. A recording medium, such as a recording sheet, which is a fixing target, passes through the nip for fixing.

A pad material which presses the fixing belt from the inside thereof, a heater for heating the fixing belt, and a holding member which holds the pad material are arranged inside the fixing belt. The pressed surface of the pad material receives a pressurizing force of the pressure roller via the fixing belt.

As a fixing device in the related art, a fixing device generally includes a reflector for reflecting radiant heat of a heater toward a fixing belt. In this fixing device, radiant heat of the heater transferred in a direction of a member other than the fixing belt, such as a holding member, is blocked by the reflector. The radiant heat is reflected in a direction of the fixing member. As a result, the heating efficiency of the fixing belt by the heater is increased.

However, in the fixing device, some of the radiant heat emitted from the heater to the reflector heats up the reflector. As a result, the heat of the heated reflector is not used for heating the fixing belt and escapes to a member other than the fixing belt, such as a holding member. Therefore, it is desirable to have a fixing device capable of more efficiently heating a fixing belt.

DETAILED DESCRIPTION

Figure 1:
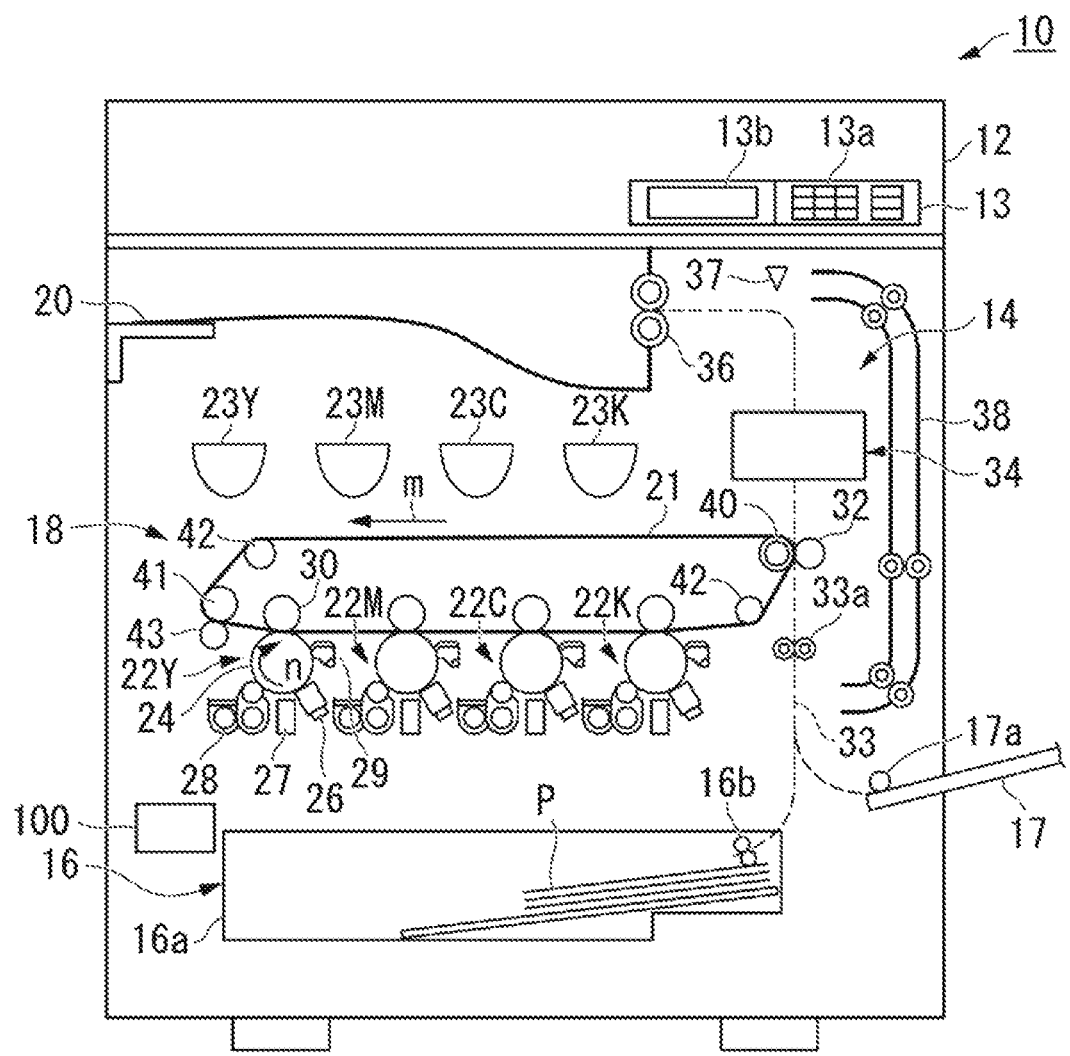
FIG. 1 is a side view of an image forming apparatus including a fixing device according to an embodiment.

In general, according to one embodiment, a fixing device includes a circulating member for fixing, a pressure member, a pad material for fixing, a heater, a reflector, and a heat conduction member. The circulating member for fixing is configured to include an annular peripheral wall which is circularly movable. The pressure member is arranged to face an outer peripheral surface of the circulating member for fixing and forms a nip with the circulating member for fixing. The pad material abuts on an inner peripheral surface of the circulating member for fixing at a nip formed portion of the circulating member for fixing. The heater is arranged inside the circulating member for fixing and heats the circulating member for fixing. The reflector is arranged inside the circulating member for fixing and the reflector reflects radiant heat of the heater to the circulating member for fixing. The heat conduction member connects an area covering a pressed portion of the pad material against the circulating member for fixing and the reflector and is formed of a material having higher thermal conductivity than the pad material.

An image forming apparatus according to an embodiment is described below with reference to drawings. In each drawing, the same components are assigned with the same reference numerals.

FIG. 1 is a side view of an overall configuration of an image forming apparatus 10 according to an embodiment. For example, the image forming apparatus 10 is a multi function peripheral. However, the image forming apparatus 10 is not limited to the above example and may be a copy machine, a printer, or the like.

The image forming apparatus 10 includes a scanner 12, a control panel 13, a main body section 14, and a control section 100. The main body section 14 includes a sheet feeding cassette section 16, a printer section 18, a fixing device 34, and the like. The control section 100 controls the entire image forming apparatus 10. For example, the control section 100 controls operations of the scanner 12, the control panel 13, the sheet feeding cassette section 16, the printer section 18, the fixing device 34, and the like.

The scanner 12 can read an original image. The control panel 13 includes input keys 13a and a display section 13b. For example, the input keys 13a receive an input of a user. For example, the display section 13b is a touch panel type. The display section 13b receives the input by the user to display the input to the user.

The sheet feeding cassette section 16 includes a cassette main body 16a and pickup rollers 16b. The cassette main body 16a houses a sheet P serving as an image medium. The pickup rollers 16b take out the sheet P from the cassette main body 16a. The sheet P taken out from the cassette main body 16a is fed to a conveyance path 33.

The printer section 18 forms an image on the sheet P. For example, the printer section 18 forms an image read from an image of an original by the scanner 12. The printer section 18 includes an intermediate transfer belt 21. The printer section 18 supports the intermediate transfer belt 21 with a backup roller 40, a driven roller 41, and tension rollers 42. The backup roller 40 is equipped with a driving section (not illustrated). The printer section 18 rotates the intermediate transfer belt 21 in an arrow m direction.

The printer section 18 includes four groups of image forming stations including the image forming stations 22Y, 22M, 22C and 22K. The image forming stations 22Y, 22M, 22C and 22K are respectively used to form a Y (yellow) image, an M (magenta) image, a C (cyan) image and a K (black) image. The image forming stations 22Y, 22M, 22C and 22K, which are located at the lower side of the intermediate transfer belt 21, are arranged in parallel along the rotation direction of the intermediate transfer belt 21.

The printer section 18 includes cartridges 23Y, 23M, 23C and 23K above the image forming stations 22Y, 22M, 22C and 22K correspondingly. The cartridges 23Y, 23M, 23C and 23K are used to house a Y (yellow) toner, an M (magenta) toner, a C (cyan) toner and a K (black) toner for replenishment.

Hereinafter, among the image forming stations 22Y, 22M, 22C and 22K, the image forming station 22Y of Y (yellow) is described as an example. Further, since the image forming stations 22M, 22C and 22K have the same configuration as the image forming station 22Y, the detailed description thereof is omitted.

The image forming station 22Y includes a charging charger 26, an exposure scanning head 27, a developing device 28, and a photoconductor cleaner 29. The charging charger 26, the exposure scanning head 27, the developing device 28, and the photoconductor cleaner 29 are arranged around a photoconductive drum 24 which rotates in the arrow n direction.

The image forming station 22Y includes a primary transfer roller 30. The primary transfer roller 30 faces the photoconductive drum 24 across the intermediate transfer belt 21.

After charging the photoconductive drum 24 with the charging charger 26, the image forming station 22Y exposes the photoconductive drum 24 with the exposure scanning head 27. The image forming station 22Y forms an electrostatic latent image on the photoconductive drum 24. The developing device 28 develops the electrostatic latent image on the photoconductive drum 24 with a two-component developing agent formed by a toner and a carrier.

The primary transfer roller 30 primarily transfers a toner image formed on the photoconductive drum 24 onto the intermediate transfer belt 21. The image forming stations 22Y, 22M, 22C and 22K form a color toner image on the intermediate transfer belt 21 with the primary transfer roller 30. The color toner image is formed by overlapping the Y (yellow) toner image, the M (magenta) toner image, the C (cyan) toner image and the K (black) toner image in order. The photoconductor cleaner 29 removes the toner left on the photoconductive drum 24 after the primary transfer.

The printer section 18 includes a secondary transfer roller 32. The secondary transfer roller 32 faces the backup roller 40 across the intermediate transfer belt 21. The secondary transfer roller 32 secondarily transfers the color toner image on the intermediate transfer belt 21 collectively onto a sheet P. The sheet P is fed from the sheet feeding cassette section 16 or a manual sheet feed tray 17 along a conveyance path 33.

The printer section 18 includes a belt cleaner 43 facing the driven roller 41 across the intermediate transfer belt 21. The belt cleaner 43 is used to remove the toner left on the intermediate transfer belt 21 after the secondary transfer.

The conveyance path 33 includes resist rollers 33a, the fixing device 34, and sheet discharging rollers 36. The printer section 18 includes a branching section 37 and a reverse conveyance section 38 at the downstream side of the fixing device 34 of the conveyance path 33. The branching section 37 sends the sheet P after a fixing processing to a discharging section 20 or the reverse conveyance section 38. In a case of duplex printing, a reverse conveyance section 38 reverses the sheet P sent from the branching section 37 to the direction of the resist rollers 33a to convey the sheet P. The image forming apparatus 10 forms a fixed toner image on the sheet P with the printer section 18 to discharge the sheet P to the discharging section 20.

The image forming apparatus 10 is not limited to a tandem developing method, and the number of the developing devices 28 is also not limited. Further, the image forming apparatus 10 may directly transfer the toner image from the photoconductive drum 24 onto the sheet P.

Figure 2:
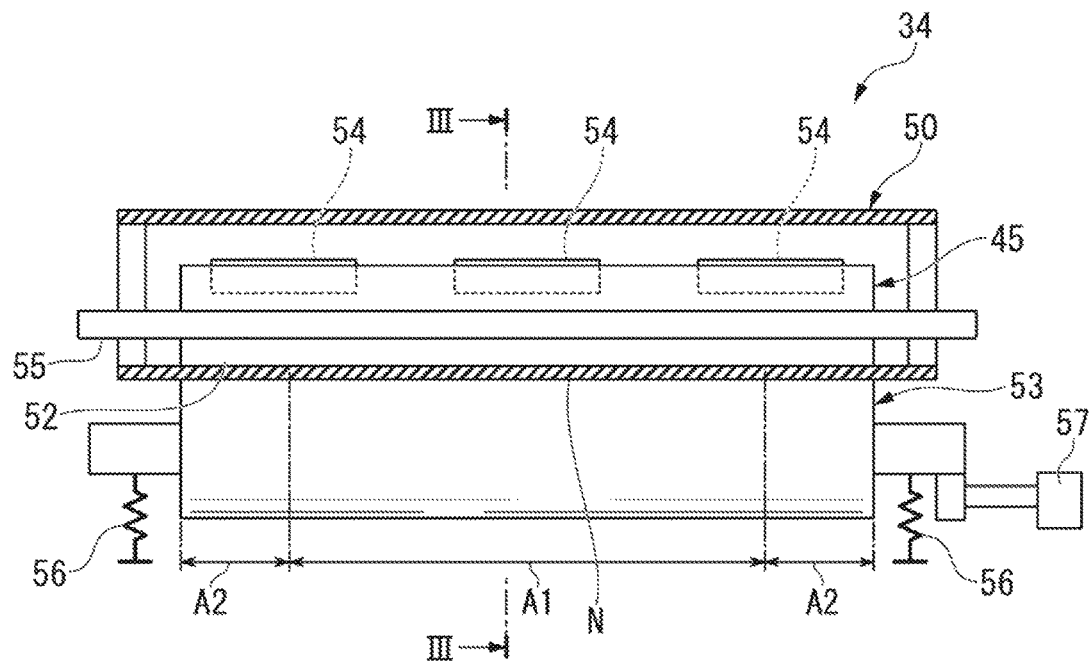
FIG. 2 is a top view of a cross section of a part of the fixing device.
Figure 3:
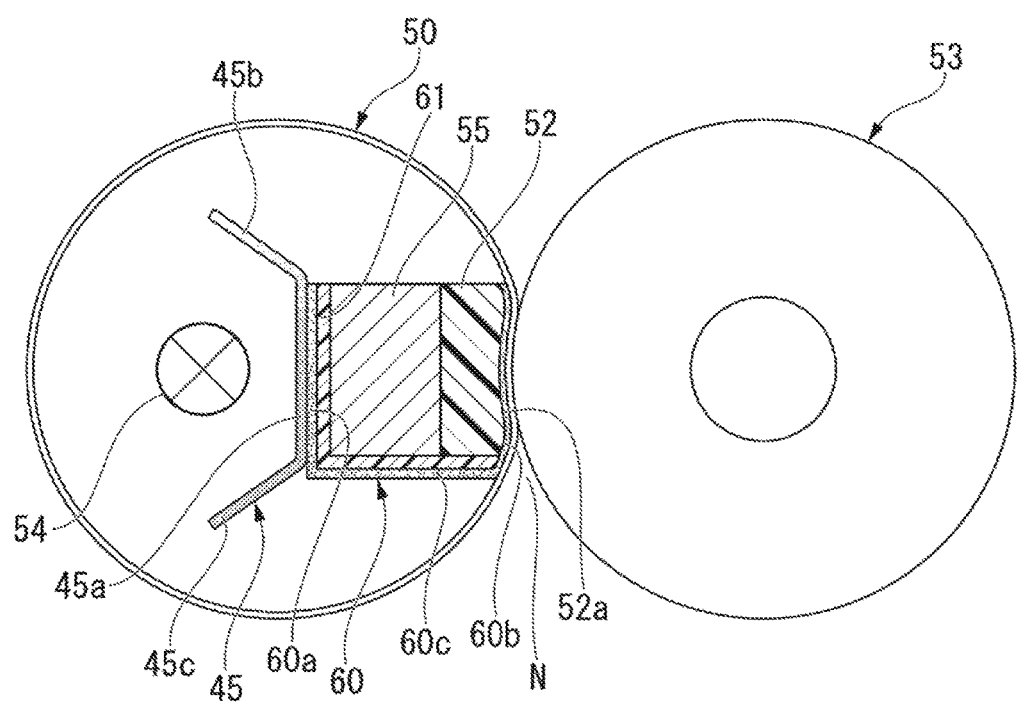
FIG. 3 is a cross-sectional view of the fixing device taken along line III-III in FIG. 2.

The fixing device 34 is described in detail below. FIG. 2 is a top view of a cross section of a part of the fixing device 34. FIG. 3 is a cross-sectional view of the fixing device 34 taken along line III-III in FIG. 2.

The fixing device 34 includes an endless fixing belt 50 of which an annular peripheral wall circularly moves and a pressure roller 53 which is arranged to face an outer peripheral surface of the fixing belt 50 and forms a nip N for fixing between the pressure roller and the fixing belt 50. The fixing belt 50 is an embodiment of the circulating member for fixing and the pressure roller 53 is an embodiment of the pressure member. In the case of the embodiment, the fixing belt 50 is formed in a substantially cylindrical shape. However, the fixing belt does not necessarily have a cylindrical shape and may have an elliptic shape or other annular cross-sectional shapes.

The fixing belt 50 has a multilayer structure. The fixing belt 50 includes a base layer of nickel, polyimide, or the like, an elastic layer of Si rubber or the like arranged outside the base layer, and a release layer arranged outside the elastic layer. Since the release layer is a layer which comes into direct contact with a toner on the sheet P (recording medium), the release layer is preferably formed of a fluorine-based resin having good releasability such as PFA. It is preferable that the inner surface of the fixing belt 50 is coated with a black fluorine-based resin to increase slidability and easily absorb radiant heat of a heater 54 which will described later.

The fixing belt 50 is driven to rotate by receiving the driving force of the pressure roller 53. The fixing belt 50 may be driven by a driving unit such as a motor separately from the pressure roller 53. In this case, a driving section of the fixing belt 50 preferably includes a one-was clutch not to generate a speed difference with the pressure roller 53.

Inside the fixing belt 50 is a pad material 52 for pressing the fixing belt 50 in a direction of the pressure roller 53. The arrangement also includes a radiation type heater 54 that heats the fixing belt 50 at the time of fixing operation. A reflector 45 reflects radiant heat of the heater 54 in a predetermined range inside the fixing belt 50. A metal holding member 55 holds the pad material 52 and the reflector 45. The holding member 55 extends to the outside from the fixing belt 50 in a longitudinal direction and end portions of both sides in the longitudinal direction are supported by a support frame (not illustrated).

The pad material 52 is arranged at a location facing the pressure roller 53 while interposing the fixing belt 50 therebetween. The pad material 52 supports the inner peripheral surface of the fixing belt 50. The pressure roller 53 pressurizes the fixing belt 50 supported by the pad material 52 and forms a nip N for fixing between the fixing belt 50 and the pressure roller 53. The pad material 52 is formed of, for example, heat resistant polyphenylene sulfide resin (PPS) or the like. A1 in FIG. 2 is a sheet passing area (an area where a sheet P having a normal width passes through) of the fixing belt 50 in the longitudinal direction. A2 in FIG. 2 is a sheet non-passing area (an area where a sheet P having a normal width does not pass through) of the fixing belt 50 in the longitudinal direction.

In some embodiments, the heater 54 may be a halogen heater or the like. The heater 54 is arranged in multiple places of the fixing belt 50 separated from each other in the longitudinal direction. The heater 54 can be supported by the reflector 45.

The reflector 45 is formed by deposition of aluminum, silver, or the like on the surface of a base formed of aluminum or the like. The reflectance of radiant heat at the reflector 45 is about 90%. About 10% of the left radiant heat not reflected by the reflector 45 is absorbed by the reflector 45. As a result, the reflector 45 is heated.

Figure 4:
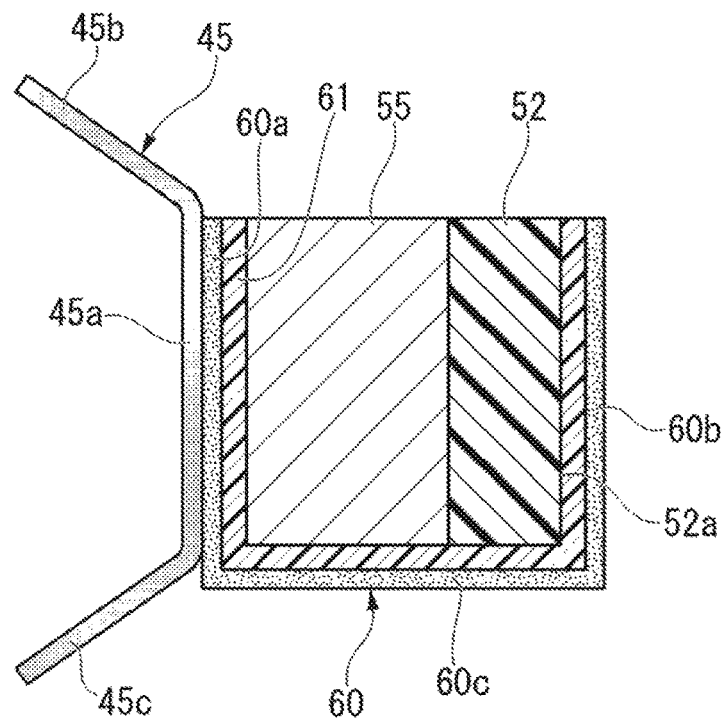
FIG. 4 is a cross-sectional view illustrating a part of the fixing device in an enlarged manner.

FIG. 4 is a cross-sectional view illustrating a block of the pad material 52 held by the holding member 55 and the reflector 45 inside the fixing belt 50. The cross-sectional view of FIG. 4 is taken at a position similar to that of FIG. 3.

The reflector 45 is formed to have an almost uniform cross section in the longitudinal direction. As in the example illustrated in FIG. 4, the reflector 45 may include a flat base wall 45a facing a rear surface of the heater 54 in a vertical posture, a flat inclined wall 45b inclined upwardly forward to form an obtuse angle with a front surface of the base wall 45a (a surface facing the heater 54) while extending from an upper end of the base wall 45a, and a flat inclined wall 45c inclined downwardly forward to form an obtuse angle with the front surface of the base wall 45a while extending from a lower end of the base wall 45a. The reflector 45 reflects the radiant heat emitted from the heater 54 to the rear surface side at each of front surfaces of the base wall 45a and the inclined walls 45b and 45c and radiates the reflected heat in a predetermined range inside the fixing belt 50. The reflector 45 blocks the radiant heat of the heater 54 from proceeding in the direction of the holding member 55 and reflects the radiant heat from the heater 54 to an area opposite to the holding member 55 on the inner peripheral surface of the fixing belt 50 while interposing the reflector 45 therebetween.

The rear surface of the heater 54 means a surface opposite to the surface of the heater 54 directly facing the inner surface of the fixing belt 50.

A heat resistant rubber layer is provided around a core metal of the pressure roller 53 and a release layer formed of a fluorine-based resin or the like is provided on the surface of the rubber layer. As illustrated in FIG. 2, the pressure roller 53 is biased by a pressure spring 56 in the direction of the outer peripheral surface of the fixing belt 50. The pressure roller 53 is driven to rotate by the motor 57. When the pressure roller 53 is driven by the motor 57, the sheet P sent to the nip N is sent to the downstream side in the conveyance direction while pressing the outer surface of the fixing belt 50.

As illustrated in FIG. 4, a heat conduction sheet 60 (heat conduction member) formed of a material having higher thermal conductivity than the pad material 52 is interposed between the holding member 55 and the base wall 45a of the reflector 45. For example, the heat conduction sheet 60 can be formed by using a sheet material having a thermal conductivity of about 200 W/mk and a thickness of about 0.5 mm. The heat conduction sheet 60 may include graphite as a main component. The thermal conductivity of the holding member 55 is set to be higher than the thermal conductivity of the pad material 52 and set to be lower than the heat conduction sheet 60 (heat conduction member).

The heat conduction sheet 60 is interposed in a connection portion of the base wall 45a of the reflector 45 and the holding member 55 and extends from the lower end of the base wall 45a to a front surface of a pressed portion 52a of the pad material 52 through the lower surface of the holding member 55 and the pad material 52. Accordingly, the heat conduction sheet 60 can transfer heat of the reflector 45 to the inner surface (the rear area of the nip N) of the fixing belt 50 at the front of the pressed portion 52a around the holding member 55 and the pad material 52.

In the case of the embodiment, a heat insulation layer 61 formed of a heat insulation sheet or the like is interposed between the heat conduction sheet 60 and the holding member 55 and between the heat conduction sheet 60 and the pad material 52. Therefore, the heat transferred from the reflector 45 to the heat conduction sheet 60 is not easily transferred to the holding member 55 and the pad material 52 and is easily transferred to the inner surface of the fixing belt 50 at the front side of the pressed portion 52a.

Here, a portion of the heat conduction sheet 60 interposed in the connection portion of the reflector 45 and the holding member 55 is referred to as a first portion 60a, a portion covering the pressed portion 52a of the pad material 52 is referred to as a second portion 60b, and a portion connecting the first portion 60a and the second portion 60b is referred to as a connection portion 60c. The heat conduction member (heat conduction sheet 60) of the embodiment is formed in a sheet-like shape in which the first portion 60a, the second portion 60b, and the connection portion 60c are continuously provided.

However, the heat conduction member does not necessarily have a sheet-like shape and may have a block shape as long as the heat can be satisfactorily transferred from the reflector 45 to the front surface side of the pad material 52 (the inner surface of the fixing belt 50).

The heat conduction sheet 60 of the embodiment is formed such that the connection portion 60c connects the first portion 60a and the second portion 60b over the lower side (one side portion) of the molding member 55 and the pad material 52. In addition, the fixing belt 50 rotates from the lower position of the holding member 55 to the nip N. Therefore, a direction from the first portion 60a to the second portion 60b through the connection portion 60c in the heat conduction sheet 60 coincides with a rotation direction of the heat conduction sheet 60. Accordingly, when the fixing belt 50 rotates in a state in which the fixing belt is pressurized by the pressure roller 53 and the pad materiel 52 at the nip N, the behavior of peeling off the heat conduction sheet 60 from the pressed portion d52a can be suppressed by the connection portion 60c.

In the case of the embodiment, thermally conductive grease (not illustrated) is applied between the base wall 45a of the reflector 45 and the heat conduction sheet 60. Thus, the thermal conductivity from the base wall 45a to the heat conduction sheet 60 is satisfactory.

Figure 5:
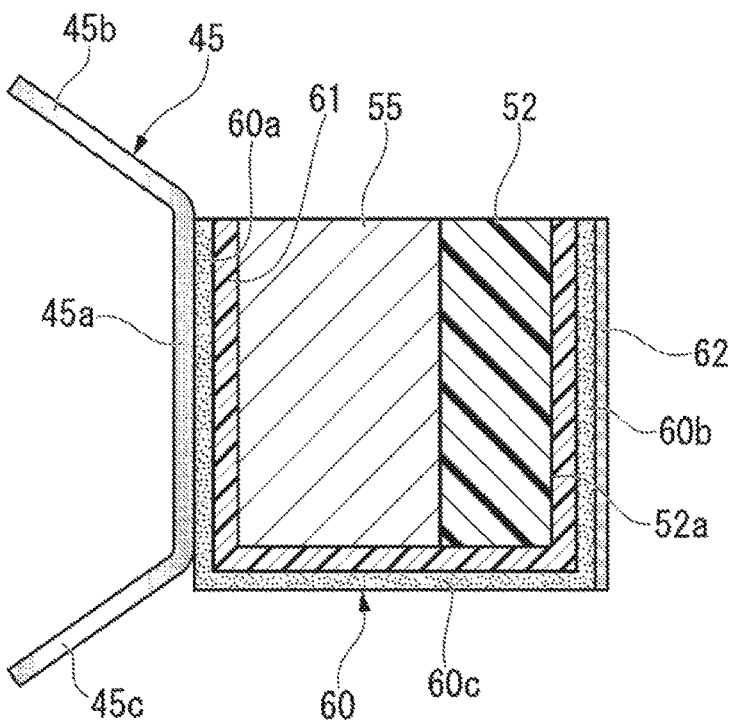
FIG. 5 is a cross-sectional view illustrating a part of a modification example of the fixing device in an enlarged manner.

FIG. 5 is a cross-sectional view similar to FIG. 4 and illustrating a modification example of the fixing device according to some embodiments. In the modification example, a slidable sheet 62 formed of a material having good slidability such as a fluorine-based resin is bonded to an outer surface of the second portion 60b of the heat conduction sheet 60 covering the pressed portion 52a of the pad material 52. In the case of the modification example, the second portion 60b of the heat conduction sheet 60 abuts on the inner peripheral surface of the fixing belt 50 through the slidable sheet 62. Therefore, the friction of the fixing belt 50 at the time of fixing operation can be reduced.

In the fixing device 34 of the embodiment, the heat conduction member (heat conduction sheet 60) formed of a material having higher thermal conductivity than the pad material 52 is provided and the heat conduction member (heat conduction sheet 60) connects the reflector 45 and the area covering the pressed portion 52a of the pad material 52.

Therefore, it is possible to efficiently heat a portion of the fixing belt 50 facing the nip N by effectively using the heat of the reflector 45 heated by the heater 54.

In the fixing device 34 of the embodiment, a part of the heat conduction member (heat conduction sheet 60) is interposed in the connection portion between the reflector 45 and the holding member 55 over a wide range. Therefore, a large amount of heat of the reflector 45 can be efficiently transferred to the portion of the fixing belt 50 facing the nip N.

In addition, in the fixing device 34 of the embodiment, the thermal conductivity of the holding member 55 is set to be higher than the thermal conductivity of the pad material 52 and set to be lower than the thermal conductivity of the heat conduction member (heat conduction sheet 60). Then, the heat insulation layer 61 is interposed between the heat conduction member (heat conduction sheet 60) and the holding member 55. Therefore, the heat of the pad material 52 more than necessary is allowed to escape to the outside through the holding member 55 and the heat of the reflector 45 can be efficiently transferred to the portion of the fixing belt 50 facing the nip N through the heat conduction member (heat conduction sheet 60).

Further, the heat conduction member (heat conduction sheet 60) adopted in the fixing device 34 of the embodiment includes the first portion 60a interposed in the connection portion of the reflector 45 and the holding member 55, the second portion 60b covering the pressed portion 52a of the pad material 52, and the connection portion 60c connecting the first portion 60a and the second portion 60b and is formed in a sheet-like shape in which these portions are continuously provided as the heat conduction sheet 60. Therefore, it is possible to avoid the heat conduction member from occupying a large space between the reflector 45 and the pad material 52. In addition, since it is sufficient to bond the continuous heat conduction sheet 60 to the reflector 45 and the pad material 52, the fixing device 34 can be easily manufactured.

In the fixing device 34 of the embodiment, the direction from the first portion 60a to the second portion 60b through the connection portion 60c in the heat conduction sheet 60 is set to coincide with the circulating direction of the fixing belt 50. Therefore, when the fixing belt 50 rotates in a state in which the fixing belt is pressed by the pressure roller 53 and the pad material 52 at the nip N, it is possible to prevent the heat conduction sheet 60 from being peeled off from the pressed portion 52a by the connection portion 60c.

In the fixing device 34 of the embodiment, thermally conductive grease is interposed at the bonded portion between the reflector 45 and the heat conduction sheet 60 and thus heat can be efficiently transferred from the reflector 45 to the heat conduction sheet 60 without loss.

Further, in the fixing device 34 of the modification example of the embodiment, the slidable sheet 62 coming into slide contact with the inner peripheral surface of the fixing belt 50 is bonded to the outer surface of the area of the heat conduction sheet 60 covering the pressed portion 52a of the pad material 52. Therefore, it is possible to reduce the sliding resistance between the heat conduction sheet 60 and the fixing belt 50 and to smooth the operation of the fixing belt 50. It is also possible to prevent the heat conduction sheet 60 from being peeled off or shifted from the pad materiel 52.

Figure 6:
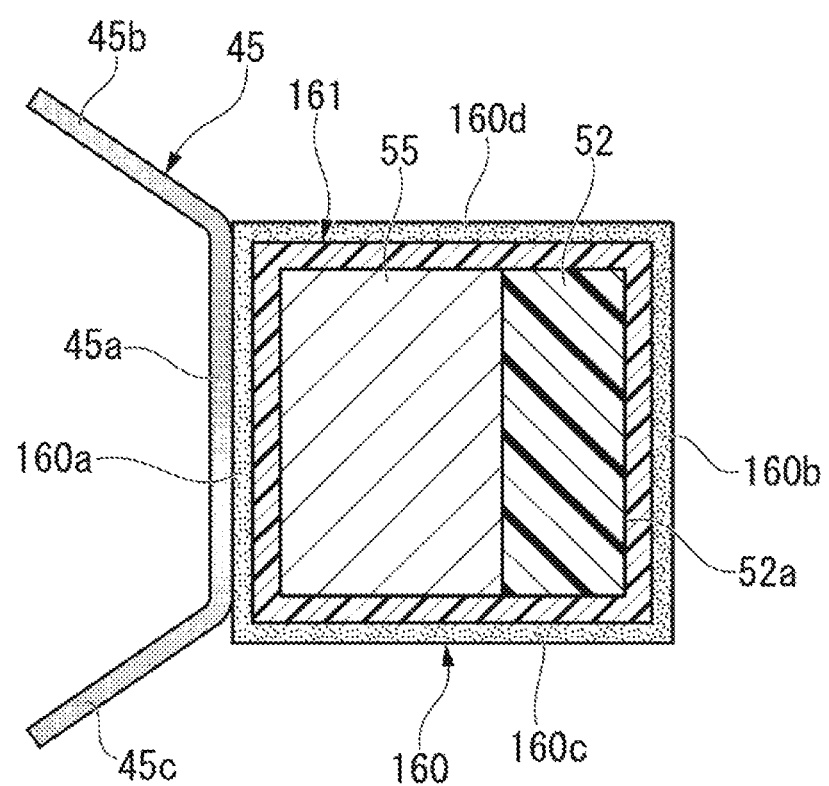
FIG. 6 is a cross-sectional view illustrating a part of a fixing device according to another embodiment in an enlarged manner.

FIG. 6 is a cross-sectional view similar to FIG. 4 and illustrating a fixing device according to another embodiment.

In the fixing device illustrated in FIG. 6, the structure of a heat conduction sheet 160 (heat conduction member) is different from the structure of the previously mentioned embodiments. The heat conduction sheet 160 includes a first portion 160a interposed in the connection portion of the reflector 45 and the holding member 55, a second portion 160b covering the pressed portion 52a of the pad material 52, a first connection portion 160c connecting the first portion 160a and the second portion 160b over the lower side (one side portion) of the holding member 55 and the pad material 52, and a second connection portion 160d connecting the first portion 160a and the second portion 160b over the upper side (other side portion) of the holding member 55 and the pad material 52. In the heat conduction sheet 160 of the embodiment, the connection portion connecting the first portion 160a and the second portion 160b is constituted of the first connection portion 160c and the second connection portion 160d. The first portion 160a, the first connection portion 160c, the second portion 160b, and the second connection portion 160d of the heat conduction sheet 160 are annularly connected to cover the vicinity of the holding member 55 and the pad material 52. In addition, a heat insulation layer 161 is interposed between each of the inner faces of the first portion 160a, the first connection portion 160c, the second portion 160b, and the second connection portion 160d, and the holding member 55 and the pad material 52.

The basic configuration of the fixing device of the embodiment is almost the same as the configuration of the fixing device of the above embodiment. Therefore, it is possible to obtain the same basic effect as in the above embodiment. However, the fixing device of the embodiment has a structure in which the heat conduction sheet 160 is annularly connected to cover the vicinity of the holding member 55 and the pad material 52. Thus, when the fixing belt rotates in a state in which the fixing belt is by pressed the pressure roller and the pad materiel 52, the heat conduction sheet 160 can be more reliably prevented from being peeled off from the pressed portion 52a. Therefore, in a case of adopting the structure of the embodiment, the pressed portion 52a of the pad material 52 can be stably covered by the heat conduction sheet 160. Accordingly, heat can be more stably transferred from the reflector to the fixing belt through the heat conduction sheet 160.

According to at least one of the embodiments described above, it is possible to efficiently heat the fixing belt by effectively using heat of the reflector heater in the fixing device including the reflector.

What is claimed is:

1. A fixing device for fixing a toner image onto a medium, the fixing device comprising:
    a circulating member for fixing toner and having an annular peripheral wall movable circularly;
    a pressure member facing an outer peripheral surface of the circulating member, the pressure member forming a nip with the circulating member;
    a pad material abutting an inner peripheral surface of the circulating member at a nip formed portion of the circulating member for fixing;
    a heater inside the circulating member, the heater configured to heat the circulating member;
    a reflector inside the circulating member and at least partially surrounding the heater, the reflector configured to reflect radiant heat of the heater toward the circulating member;
    a heat conductor connecting the reflector to an area in between a compressed portion of the pad material and the circulating member, wherein the heat conductor is made of a material having a higher thermal conductivity than the pad material; and a holder inside the circulating member, the holder holding the pad material and the reflector, wherein a part of the heat conductor is interposed in a connection portion of the reflector and the holder.

2. The device according to claim 1, wherein thermal conductivity of the holder is set to be higher than thermal conductivity of the pad material and lower than thermal conductivity of the heat conductor.

3. The device according to claim 1, further comprising a heat insulation layer between the heat conductor and the holder.

4. The device according to claim 1, wherein the heat conductor includes:

a first portion interposed in a connection portion of the reflector and the holder, a second portion covering the pressed portion of the pad material, and a connection portion connecting the first portion and the second portion, and wherein the heat conductor is formed in a sheet-like shape in which the first portion, the second portion, and the connection portion are continuously provided.

5. The device according to claim 4, wherein the connection portion connects the first portion and the second portion over one side portion of the holder and the pad material, and a direction from the first portion to the second portion through the connection portion is set to coincide with a circulating direction of the circulating member for fixing.

6. The device according to claim 4, wherein the connection portion includes a first connection portion connecting the first portion and the second portion over one side portion of the holder and the pad material, and a second connection portion connecting the first portion and the second portion over the other side portion of the holder and the pad material opposite to the one side portion, and the first portion, the first connection portion, the second portion, and the second connection portion are annularly connected to cover a vicinity of the holder and the pad material.

7. The device according to claim 1, wherein the reflector includes a thermally conductive grease interposed between the reflector and the heat conductor.

8. The device according to claim 1, further comprising a slidable sheet configured to slidably contact with the inner peripheral surface of the circulating member, the slidable sheet being bonded to an outer surface of an area of the heat conductor covering the pressed portion of the pad material.

9. An image forming apparatus comprising:

a printer configured to transfer a toner image onto a recording medium; and a fixing device configured to apply energy to fix the toner image onto the recording medium, wherein the fixing device includes:

a circulating member having an annular peripheral wall that is circularly movable, a pressure member facing an outer peripheral surface of the circulating member and forming a nip with the circulating member, a pad material abutting an inner peripheral surface of the circulating member adjacent the nip, a heater inside the circulating member, the heater operable to heat the circulating member, a reflector inside the circulating member and partially surrounding the heater to reflect radiant heat of the heater toward the circulating member, and a heat conductor connecting the reflector to an area in between a compressed portion of the pad material and the circulating member, wherein the heat conductor is made of a material having a higher thermal conductivity than the pad material, wherein the fixing device further comprises a holder inside the circulating member, the holder holding the pad material and the reflector, wherein a part of the heat conductor is interposed in a connection portion of the reflector and the holder.

10. The image forming apparatus of claim 9, wherein thermal conductivity of the holder is set to be higher than thermal conductivity of the pad material and lower than thermal conductivity of the heat conductor.

11. The image forming apparatus of claim 9, wherein the fixing device further comprises a heat insulation layer between the heat conductor and the holder.

12. The image forming apparatus of claim 9, wherein the heat conductor includes:

a first portion interposed in a connection portion of the reflector and the holder, a second portion covering the pressed portion of the pad material, and a connection portion connecting the first portion and the second portion, and wherein the heat conductor is formed in a sheet-like shape in which the first portion, the second portion, and the connection portion are continuously provided.

13. The image forming apparatus of claim 12, wherein the connection portion connects the first portion and the second portion over one side portion of the holder and the pad material, and a direction from the first portion to the second portion through the connection portion is set to coincide with a circulating direction of the circulating member for fixing.

14. The image forming apparatus of claim 12, wherein the connection portion includes a first connection portion connecting the first portion and the second portion over one side portion of the holder and the pad material, and a second connection portion connecting the first portion and the second portion over the other side portion of the holder and the pad material opposite to the one side portion, and the first portion, the first connection portion, the second portion, and the second connection portion are annularly connected to cover a vicinity of the holder and the pad material.

15. The image forming apparatus of claim 9, wherein the reflector includes a thermally conductive grease interposed between the reflector and the heat conductor.

16. The image forming apparatus of claim 9, wherein the fixing device further comprises a slidable sheet coming into slidable contact with the inner peripheral surface of the circulating member, the slidable sheet being bonded to an outer surface of an area of the heat conductor covering the pressed portion of the pad material.

17. A device for fixing toner onto a medium by heat, the device comprising a hot belt pressed against a pressure roller, wherein the roller is rigid relative to the hot belt and provides a rotation motion for operation, and wherein the hot belt further comprises:

an outer surface and an inner surface, the outer surface in contact with the pressure roller and operable to receive the medium;

a heater for heating up the inner surface;

a reflector partially surrounding the heater for generating a directional heat and heating up a portion of the inner surface;

a holder supporting the heater, the reflector, and a pad material, wherein the pad material flexibly connects a portion of the hot belt in contact with the pressure roller to the holder; and a heat conductor connecting the reflector to the inner surface for transferring heat captured in the reflector to the portion of the hot belt, wherein the heat conductor is slidable against the inner surface of the rotating hot belt, wherein the heat conductor surrounds the holder and the pad material, and is thermally insulated from the holder and the pad material by an insulator.

\* \* \* \* \*